(12) United States Patent
Novin

(10) Patent No.: US 10,287,810 B2
(45) Date of Patent: May 14, 2019

(54) PIVOT DEVICE AND METHOD OF GENERATING ASYMMETRIC FRICTION TORQUE

(71) Applicant: Southco, Inc., Concordville, PA (US)

(72) Inventor: Eugene Novin, Concordville, PA (US)

(73) Assignee: SOUTHCO, INC., Concordville, PA (US)

( * ) Notice: Subject to any disclaimer, the term of this patent is extended or adjusted under 35 U.S.C. 154(b) by 0 days.

(21) Appl. No.: 15/552,023

(22) PCT Filed: Feb. 18, 2016

(86) PCT No.: PCT/US2016/018427
§ 371 (c)(1),
(2) Date: Aug. 18, 2017

(87) PCT Pub. No.: WO2016/134120
PCT Pub. Date: Aug. 25, 2016

(65) Prior Publication Data
US 2018/0038143 A1 Feb. 8, 2018

Related U.S. Application Data

(60) Provisional application No. 62/118,202, filed on Feb. 19, 2015.

(51) Int. Cl.
*E05D 11/08* (2006.01)
*E05D 5/14* (2006.01)
(Continued)

(52) U.S. Cl.
CPC .............. *E05D 11/084* (2013.01); *E05D 3/02* (2013.01); *E05D 5/14* (2013.01); *F16C 11/04* (2013.01);
(Continued)

(58) Field of Classification Search
CPC .......... E05Y 2900/606; E05Y 2201/26; H04M 1/0216; E05D 11/082; E05D 11/084;
(Continued)

(56) References Cited

U.S. PATENT DOCUMENTS 2,862,229 A * 12/1958 Bacca ................... E05D 11/082
16/342
5,018,244 A 5/1991 Hino
(Continued)

FOREIGN PATENT DOCUMENTS

CN 101725623 A 6/2010
DE 69006643 T2 7/1994
(Continued)

OTHER PUBLICATIONS

International Search Report and Written Opinion for International Application No. PCT/US2016/018427, dated May 31, 2016—11 Pages.
(Continued)

*Primary Examiner* — Chuck Y Mah
(74) *Attorney, Agent, or Firm* — RatnerPrestia

(57) ABSTRACT

A pivot device having asymmetric friction torque is provided. The pivot device includes a shaft extending along a longitudinal axis, a sleeve surrounding the shaft, the sleeve defining a gap extending longitudinally, the sleeve and the shaft being configured for rotation with respect to one another about the longitudinal axis, and a helical compression element surrounding the sleeve and exerting a compressive force onto the sleeve, wherein a first torque required to rotate the sleeve and the shaft with respect to one another in a first direction differs from a second torque required to rotate the sleeve and the shaft with respect to one another in
(Continued)

a second direction opposite to the first direction. A method for providing a pivot device asymmetric friction torque is also provided.

32 Claims, 19 Drawing Sheets

(51) Int. Cl.
    *E05D 3/02*     (2006.01)
    *F16C 11/04*     (2006.01)
    *E05D 3/04*     (2006.01)

(52) U.S. Cl.
    CPC .......... *E05D 3/04* (2013.01); *E05D 2005/145* (2013.01); *E05Y 2201/26* (2013.01); *E05Y 2900/606* (2013.01)

(58) Field of Classification Search
    CPC ........... E05D 11/085; E05D 3/02; E05D 5/14; E05D 2005/145; F16C 11/04
    See application file for complete search history.

(56) References Cited

U.S. PATENT DOCUMENTS

| | | | | |
|---|---|---|---|---|
| 5,354,028 A * | 10/1994 | Kitamura | ............... | F16M 11/06 16/342 |
| 5,491,874 A * | 2/1996 | Lowry | ................. | G06F 1/1616 16/337 |
| 5,503,491 A * | 4/1996 | Lu | ........................ | G06F 1/1616 16/339 |
| 5,564,163 A * | 10/1996 | Lowry | ................. | G06F 1/1616 16/342 |
| 5,566,048 A * | 10/1996 | Esterberg | .............. | G06F 1/1616 16/307 |
| 5,749,124 A | 5/1998 | Lu | | |
| 5,771,539 A * | 6/1998 | Wahlstedt | ............... | F16D 7/022 16/285 |
| 8,024,842 B2 * | 9/2011 | Shen | ..................... | G06F 1/1616 16/307 |
| 8,082,627 B2 * | 12/2011 | Chien | ................. | H04M 1/0216 16/341 |
| 2004/0049883 A1 * | 3/2004 | Huang | .................. | G06F 1/1616 16/295 |
| 2005/0242594 A1 | 11/2005 | Arakawa | | |
| 2007/0039131 A1 * | 2/2007 | Rude | ..................... | E05F 1/1215 16/277 |
| 2008/0034542 A1 | 2/2008 | Lee | | |
| 2014/0007379 A1 * | 1/2014 | Yang | ..................... | G06F 1/1681 16/277 |
| 2015/0092335 A1 | 4/2015 | Patrick et al. | | |

FOREIGN PATENT DOCUMENTS

DE      4335962 A1      4/1995
EP      0402924 A1      12/1990

OTHER PUBLICATIONS

German Communication for German Application No. 11 2016 000 844.9, dated Oct. 27, 2017 with translation, 11 pages.
Chinese Office Action for Chinese Application No. 201680010941.0, with English Transaltion, dated Sep. 30, 2018—19 pages.

* cited by examiner

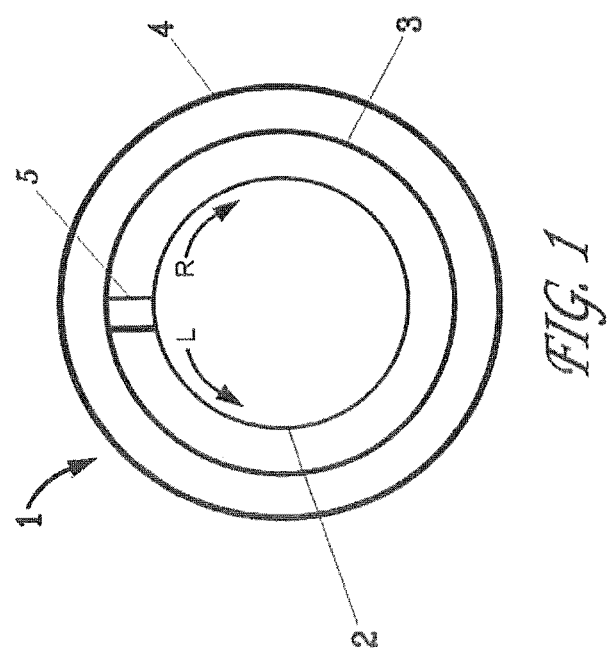

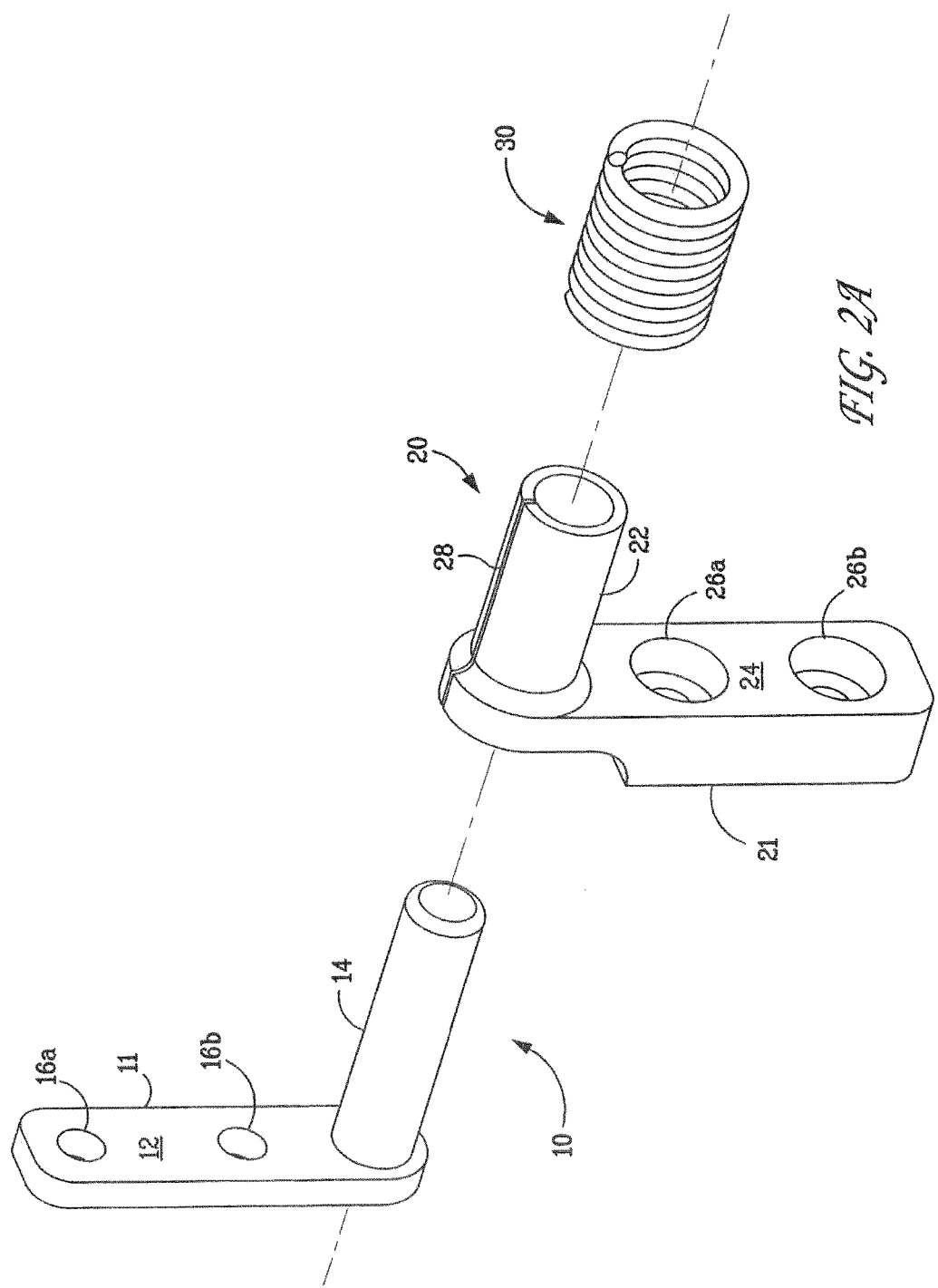

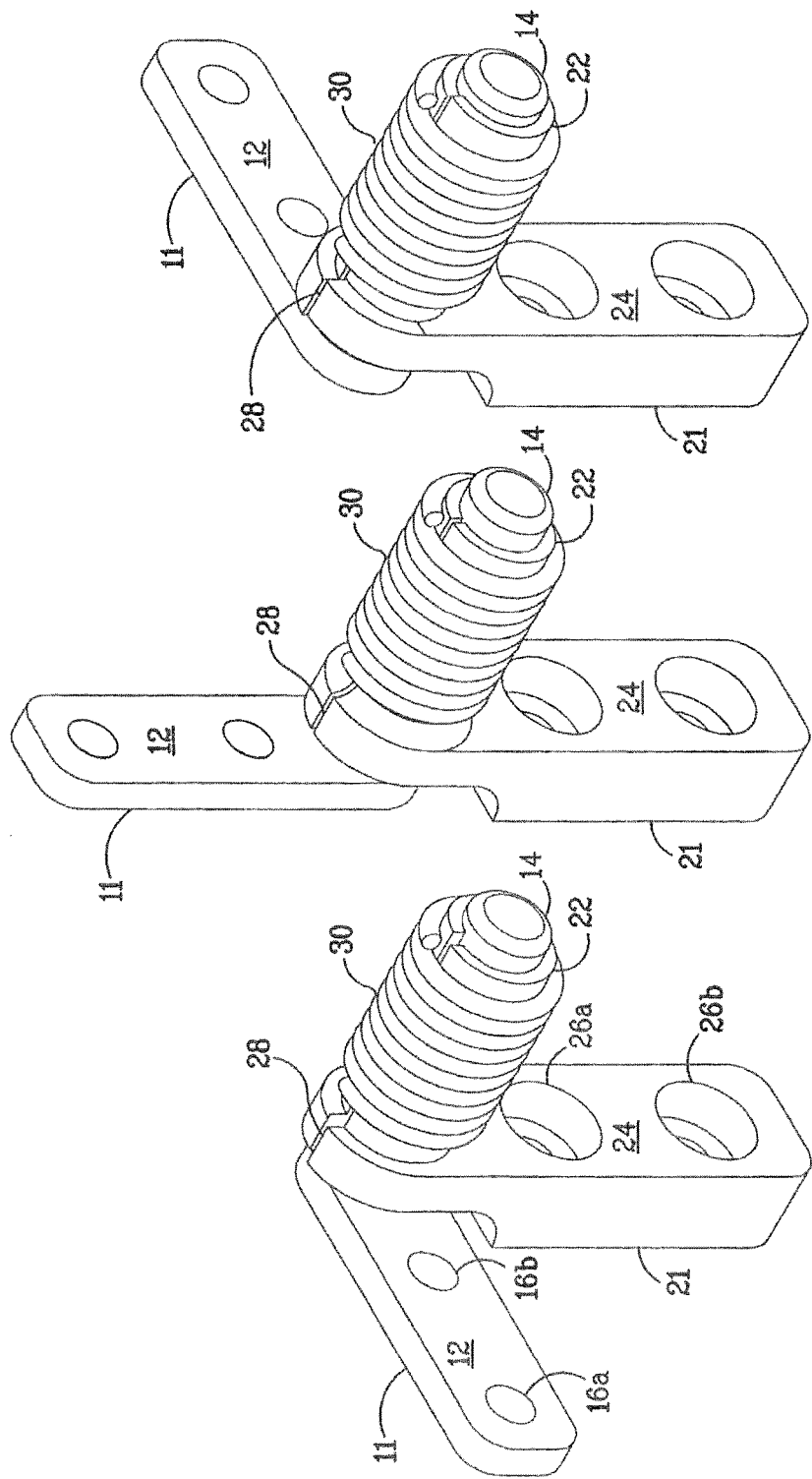

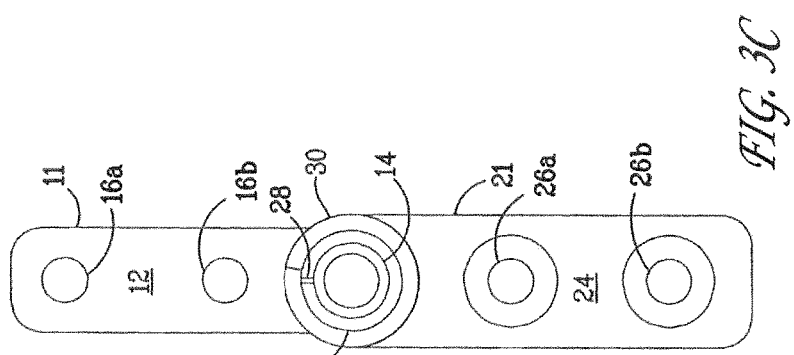
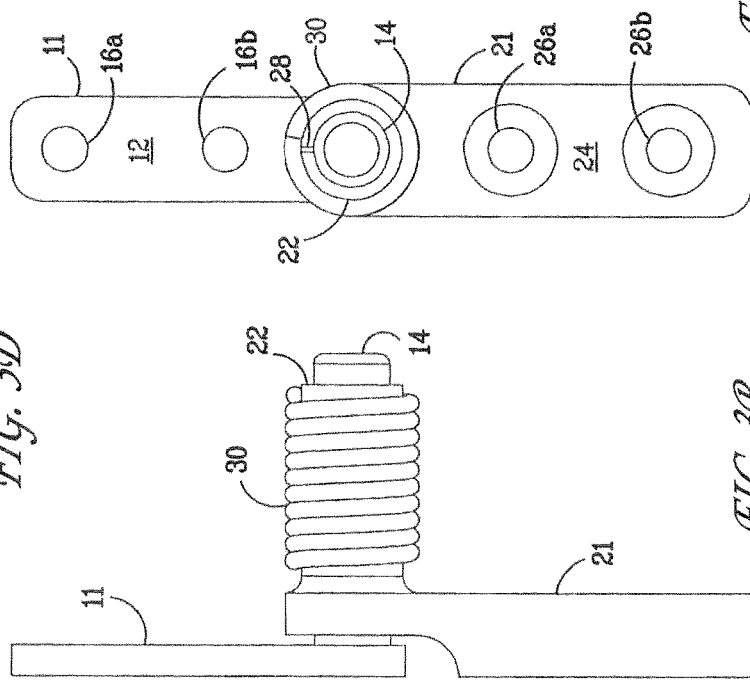
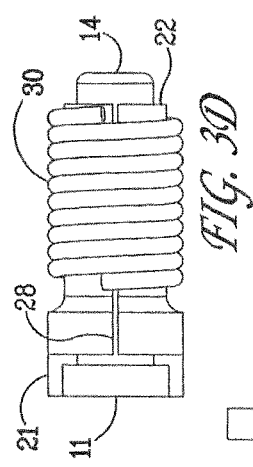
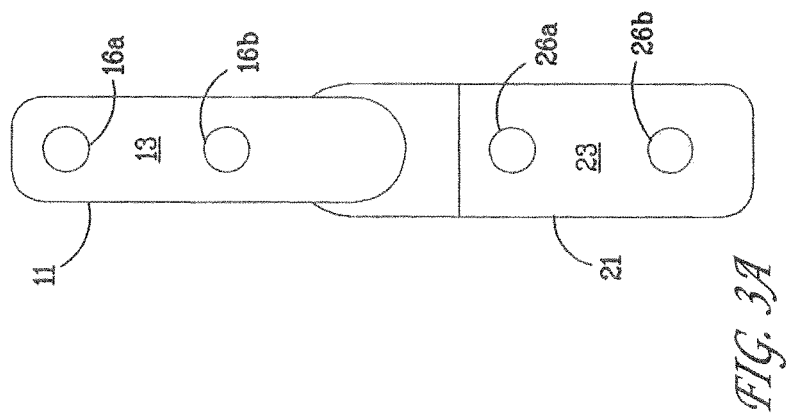

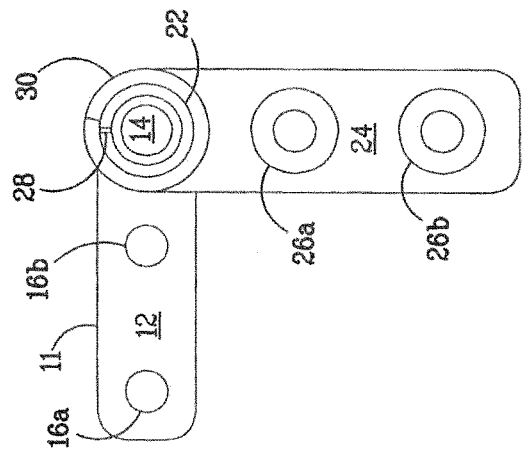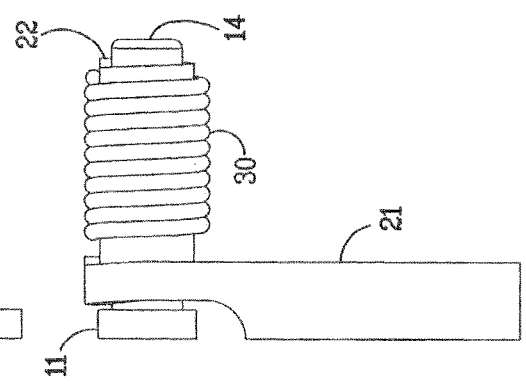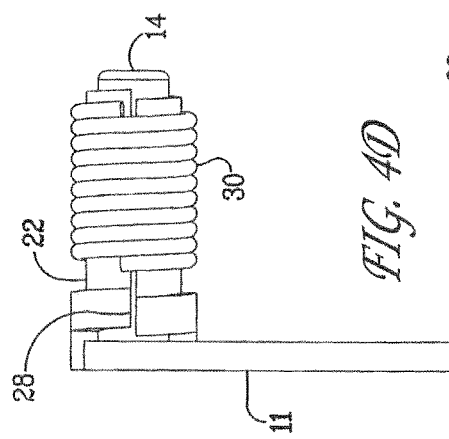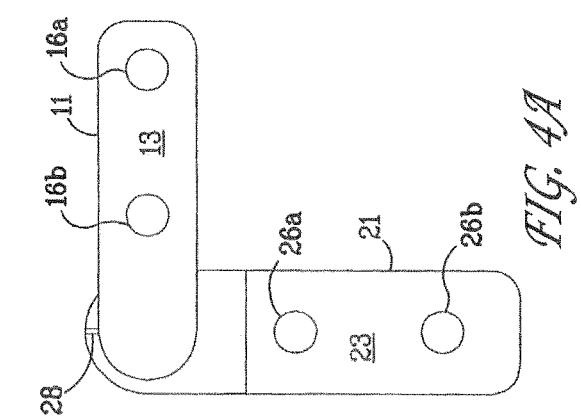

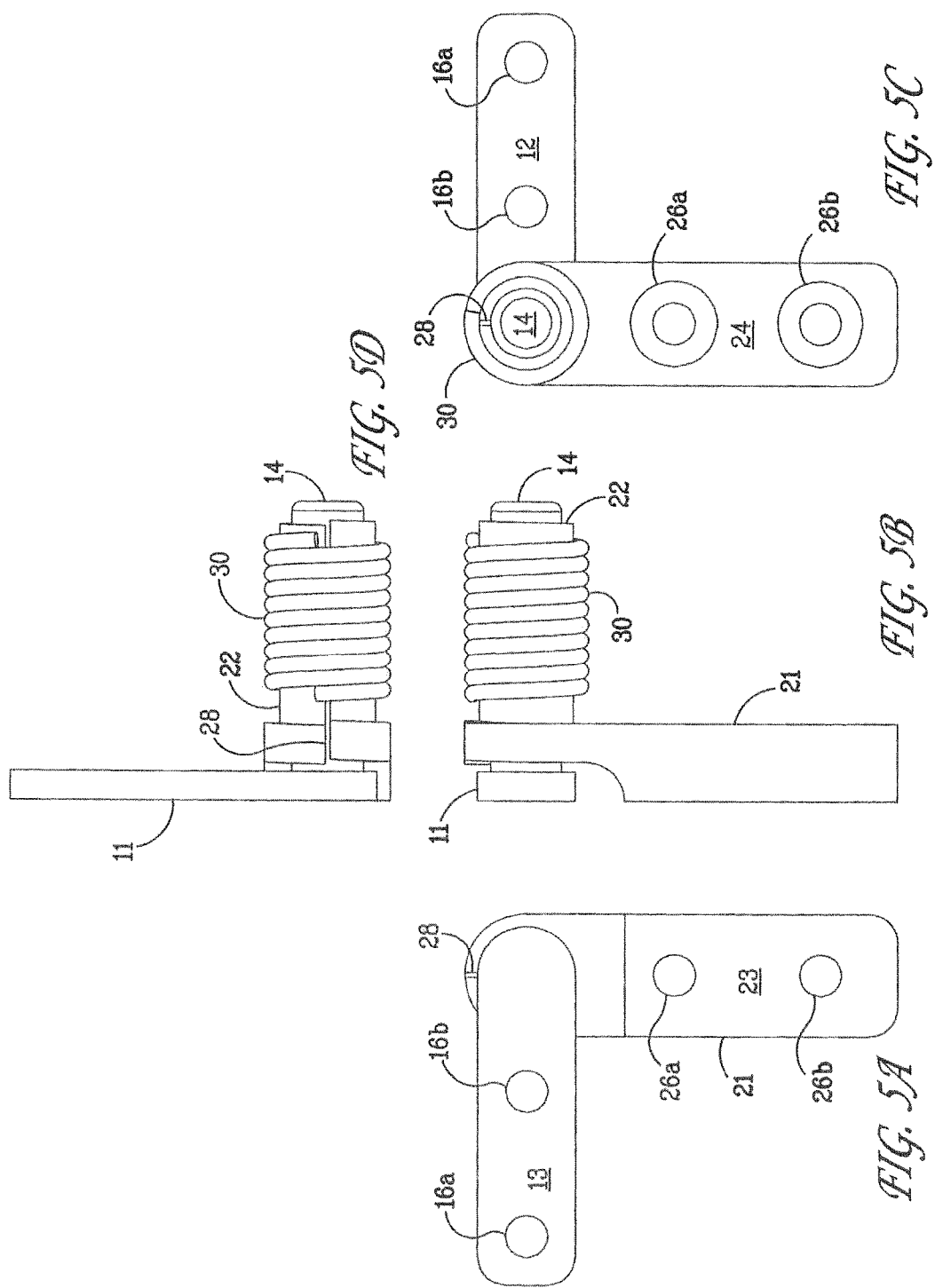

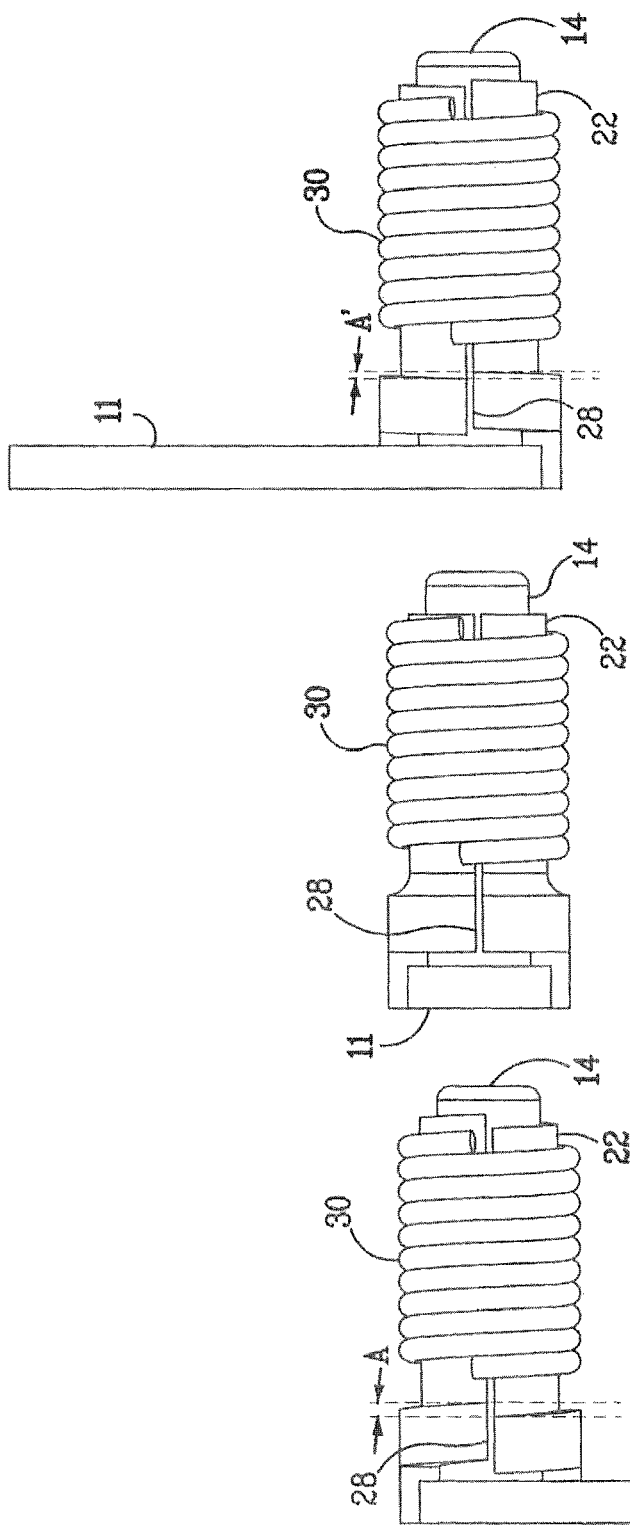

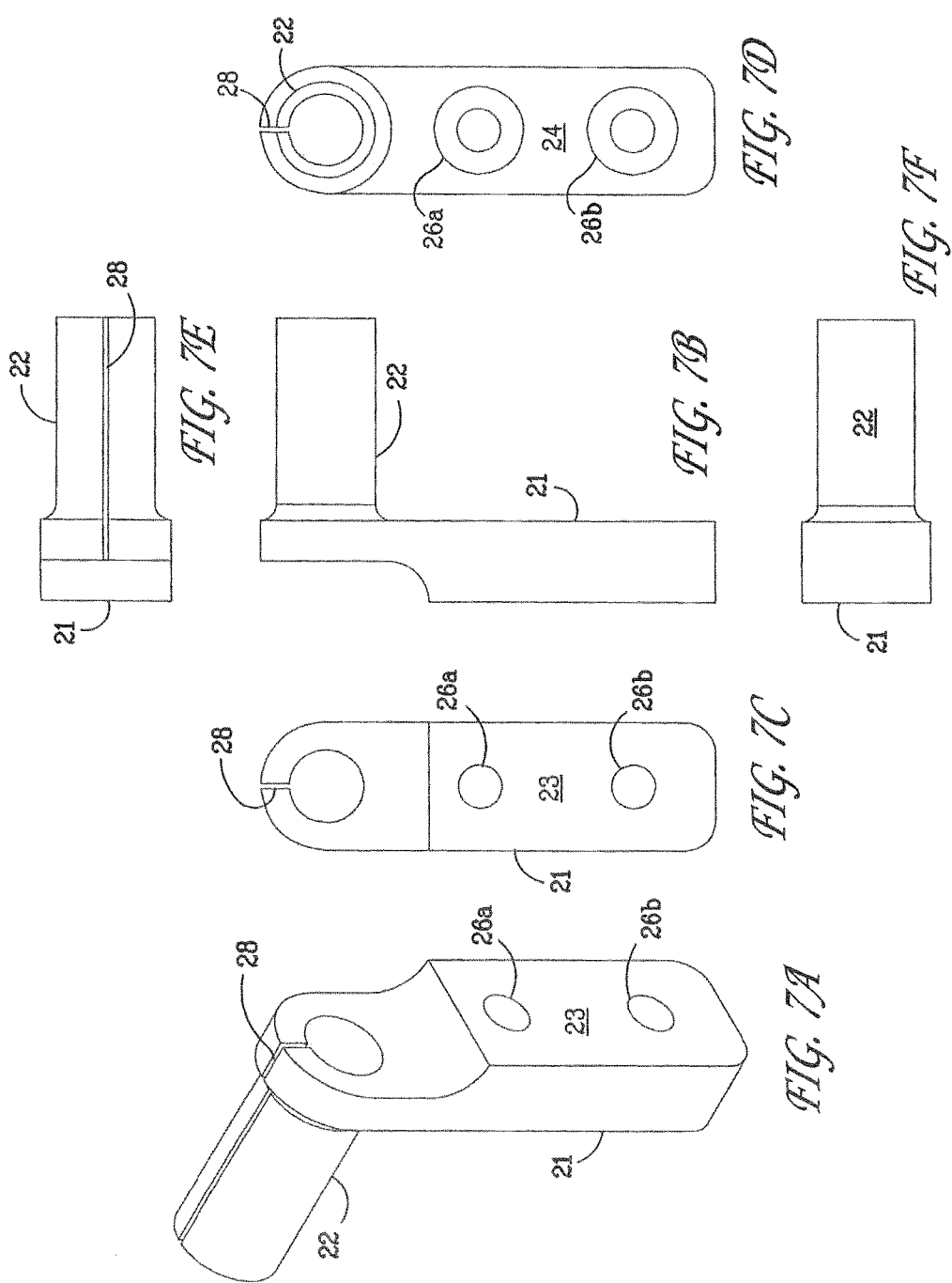

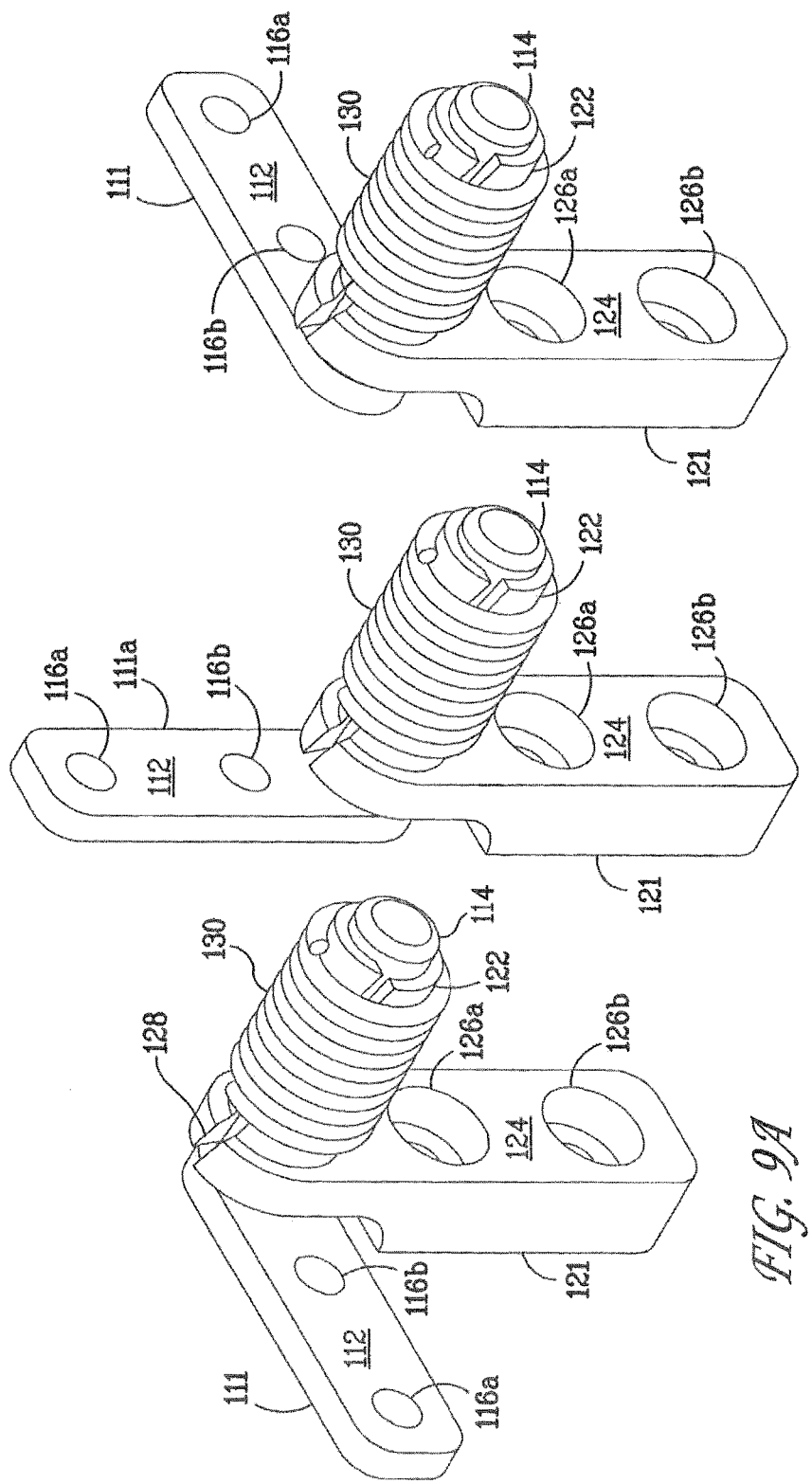

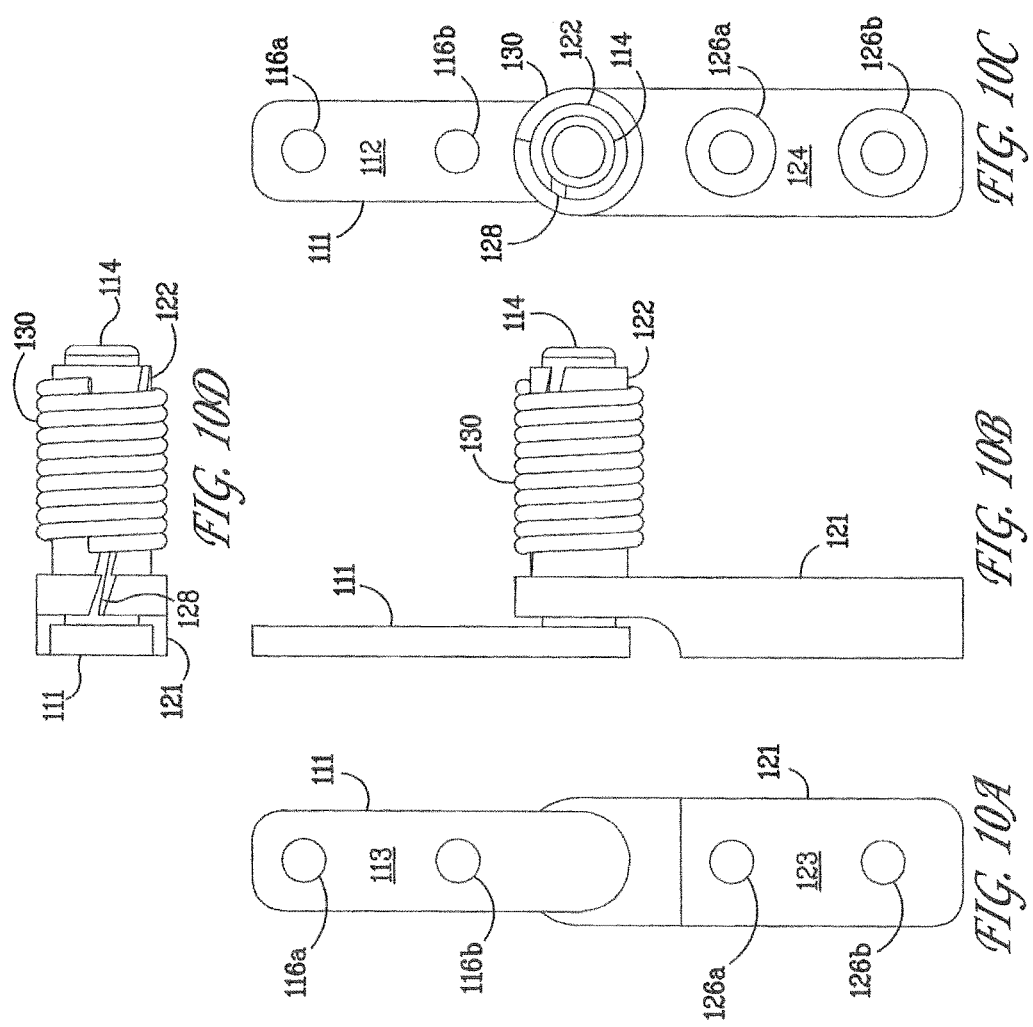

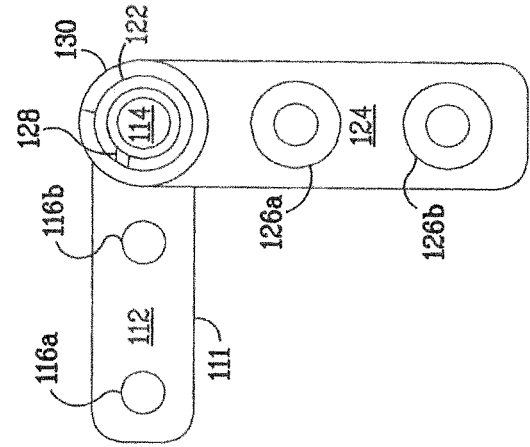
FIG. 11C
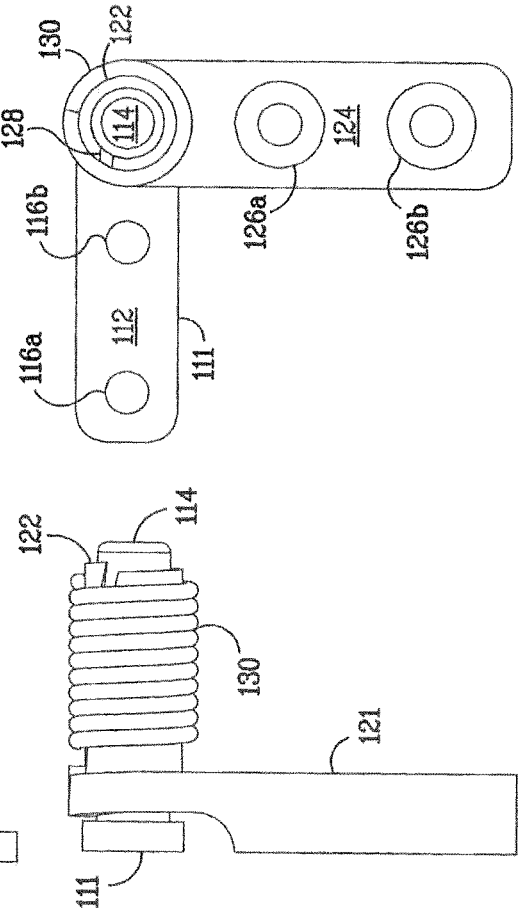
FIG. 11D
FIG. 11B
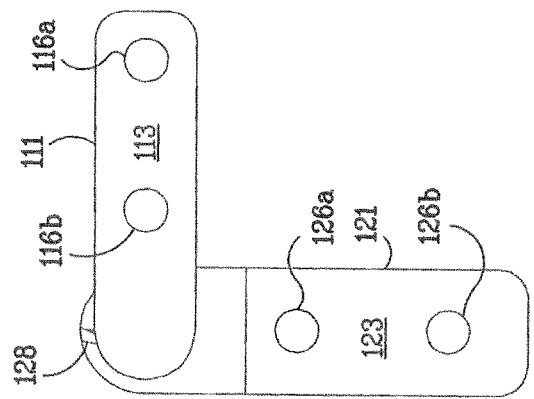
FIG. 11A

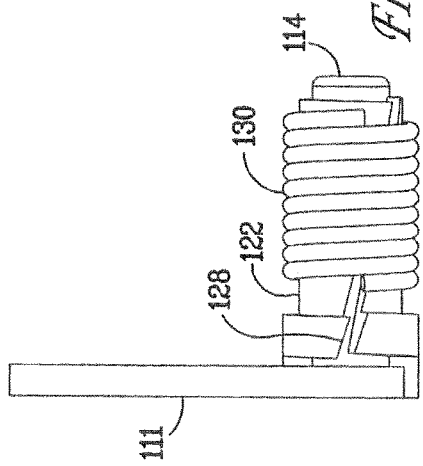
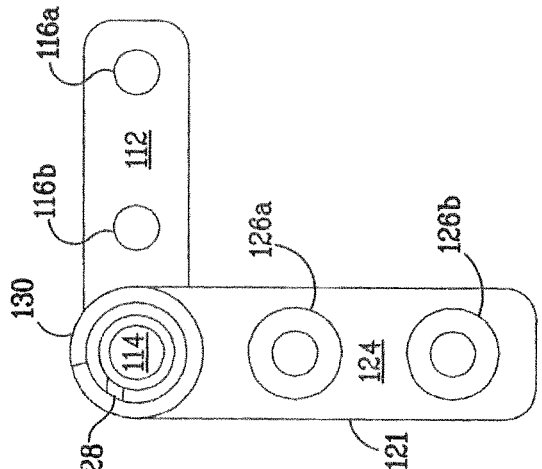
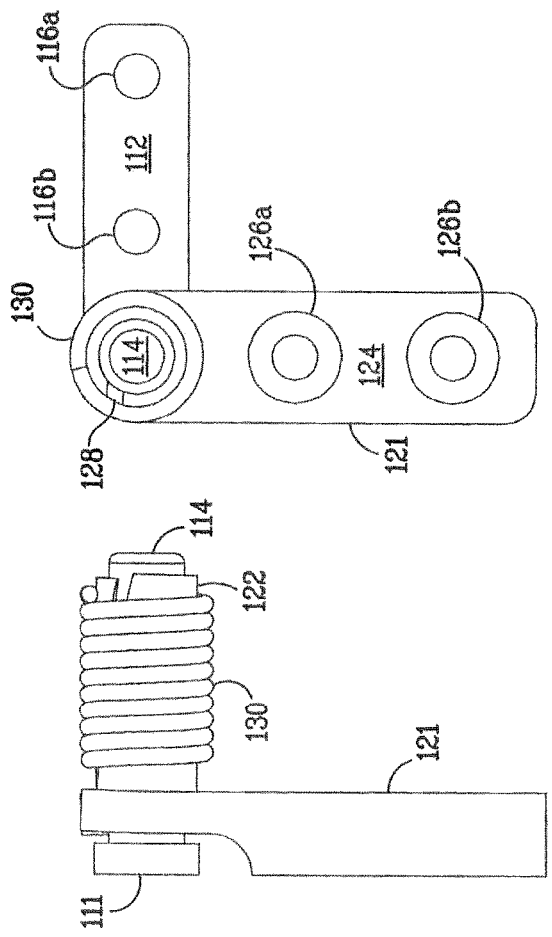
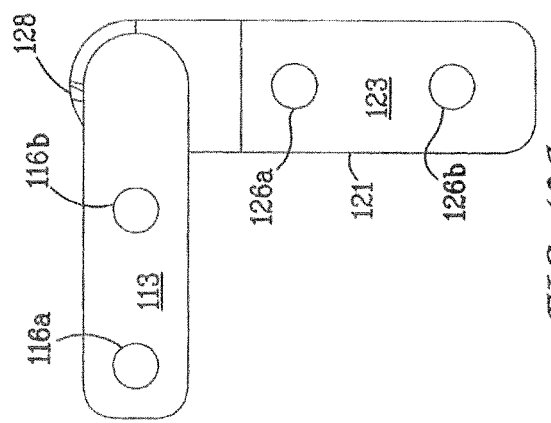

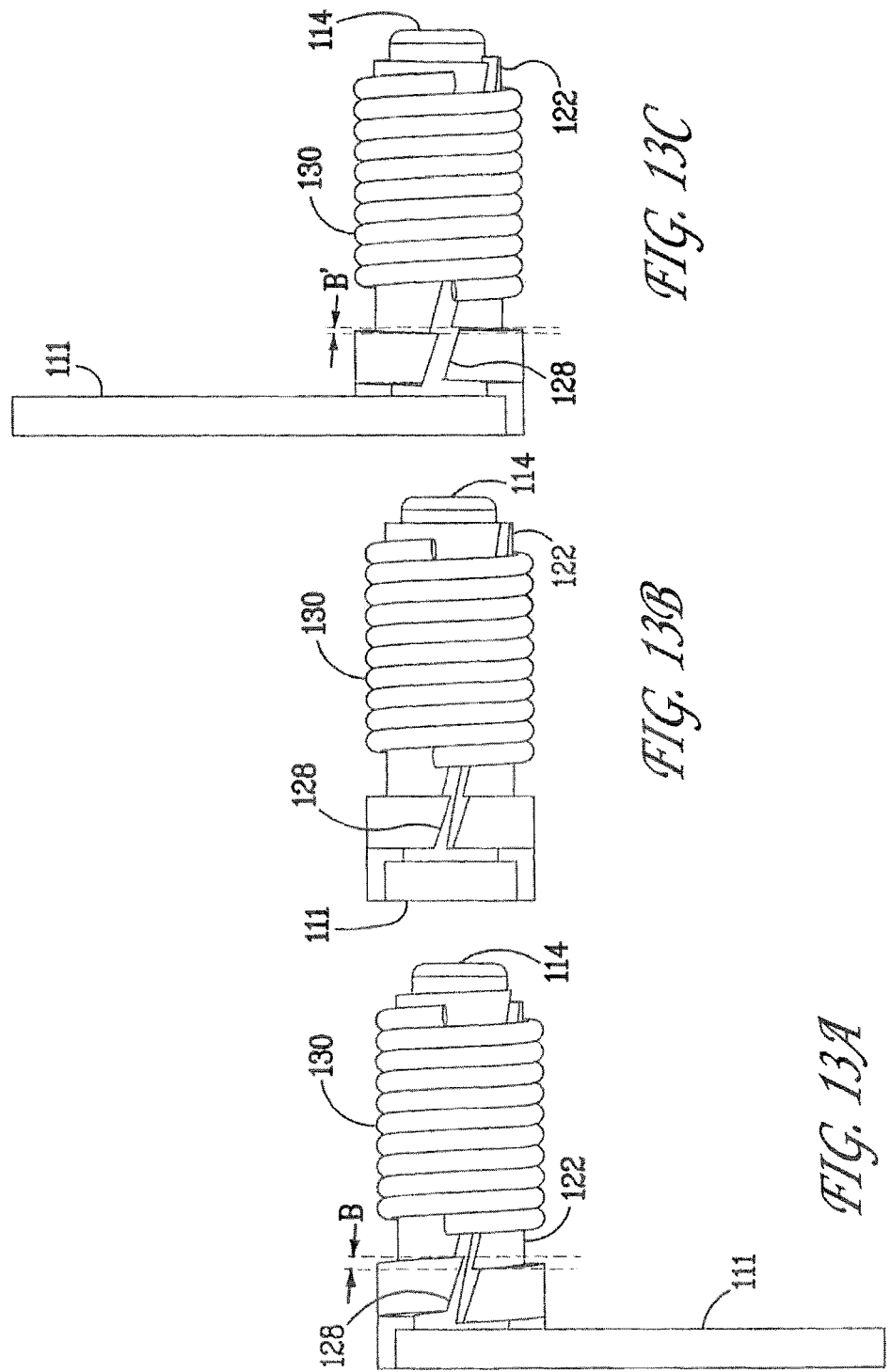

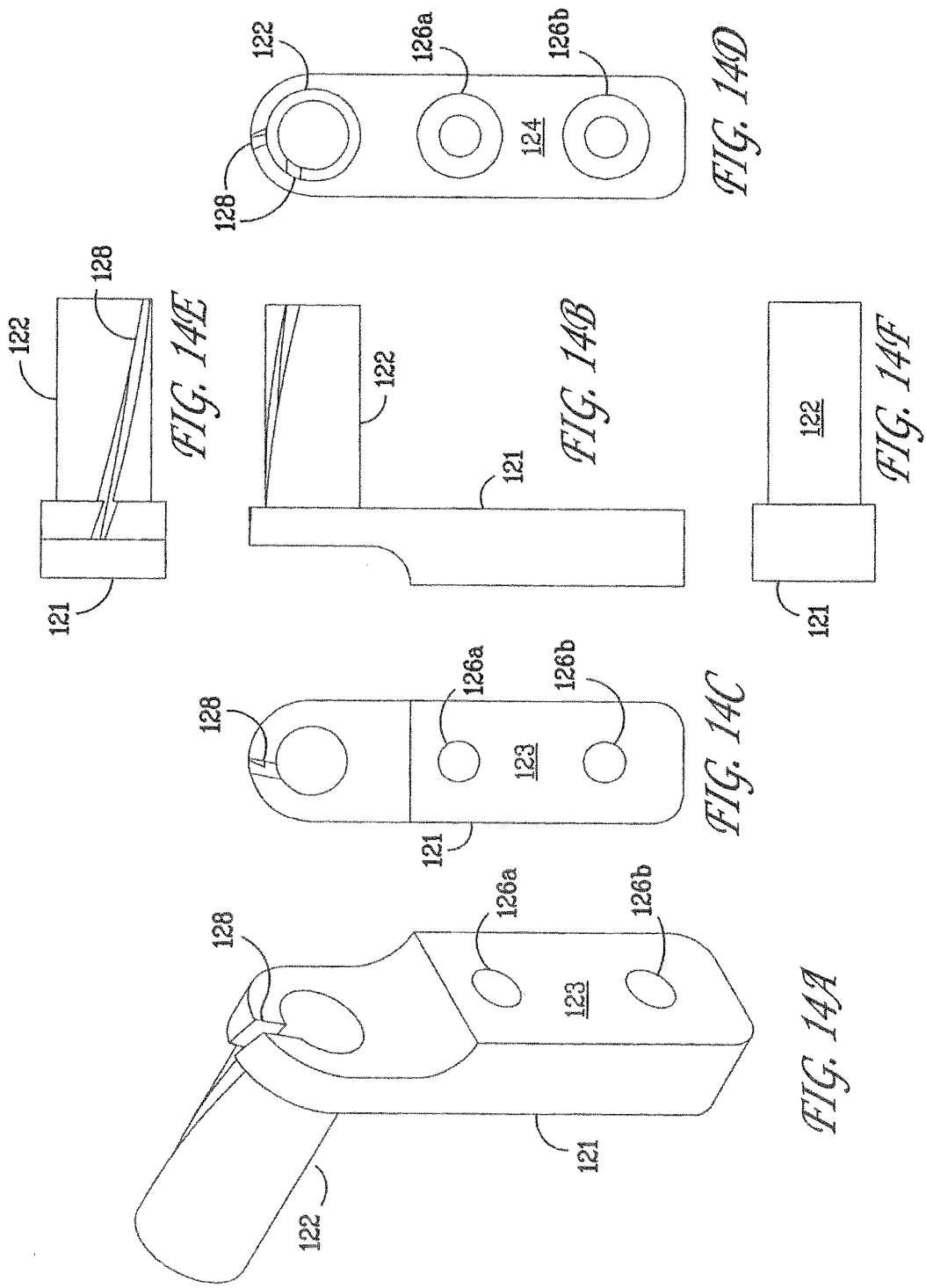

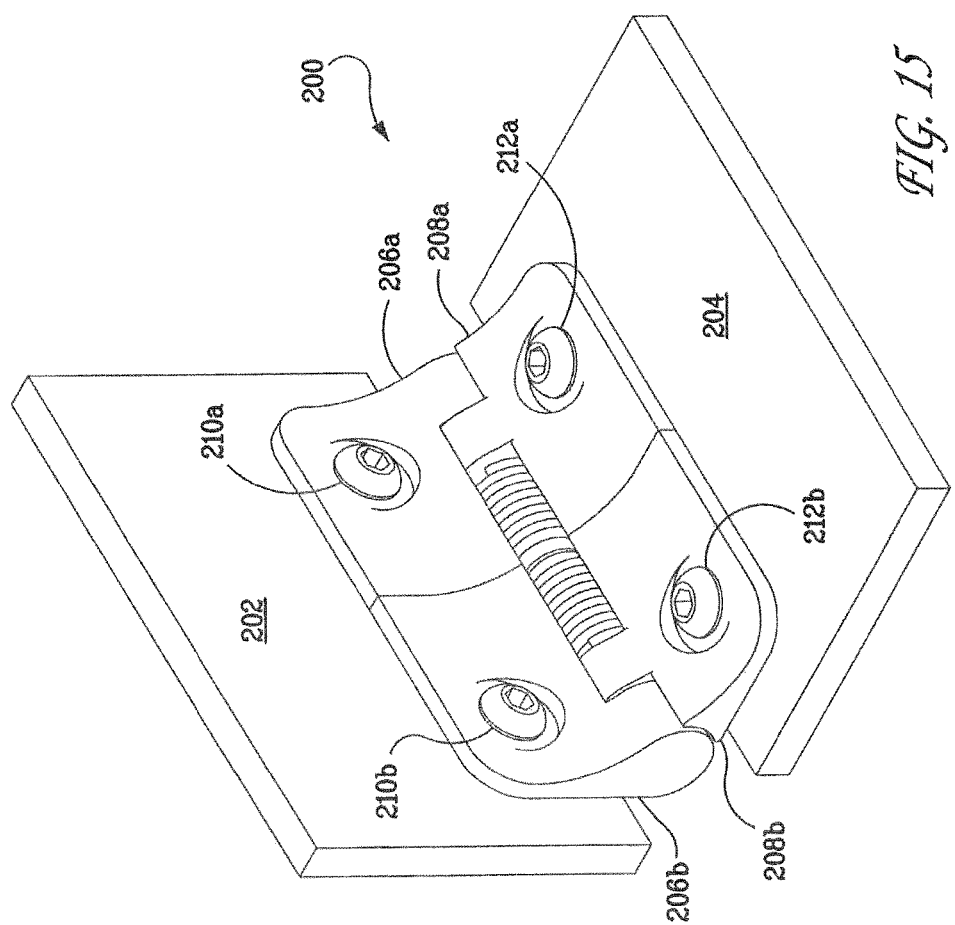

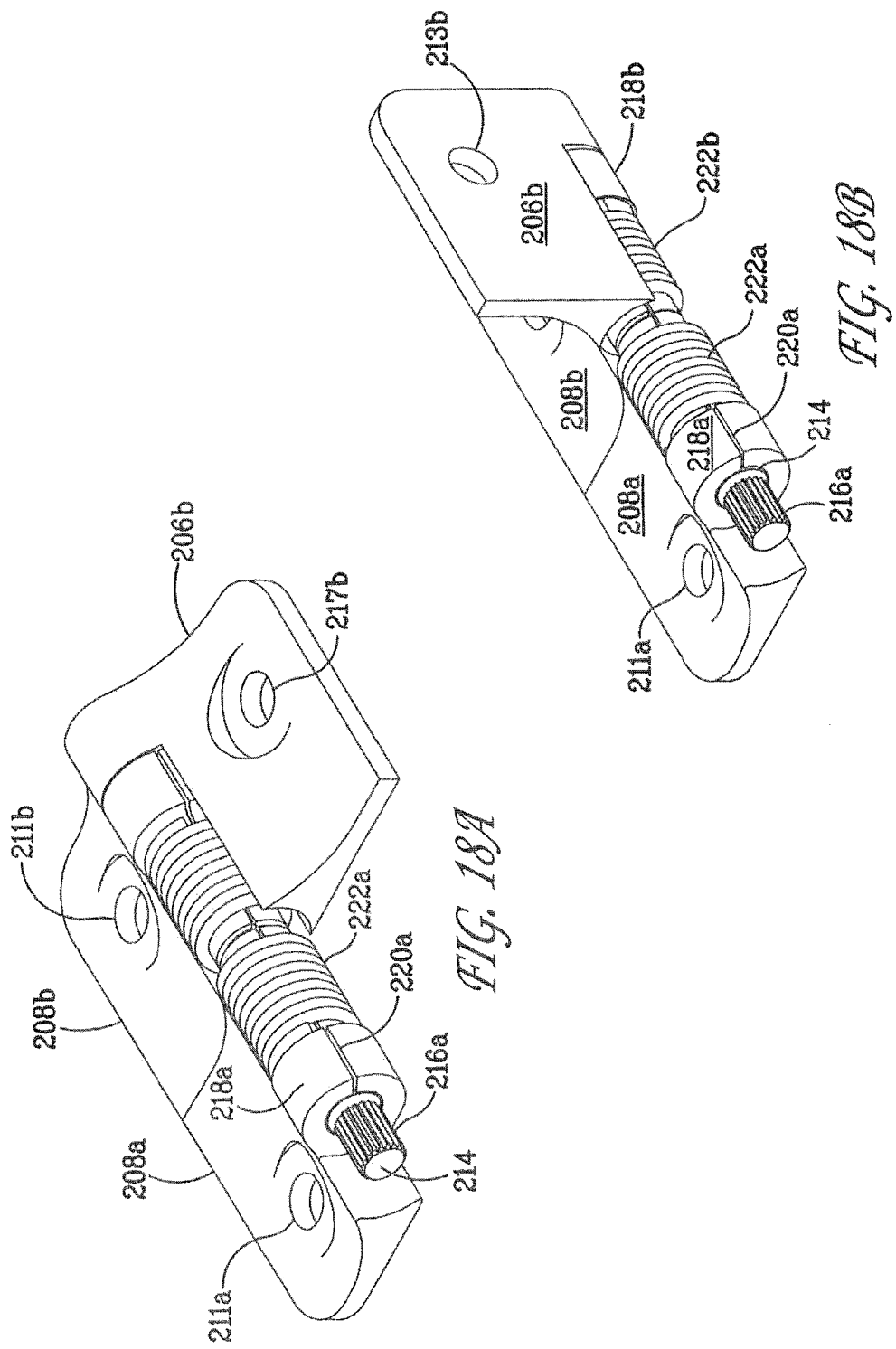

PIVOT DEVICE AND METHOD OF GENERATING ASYMMETRIC FRICTION TORQUE

CROSS-REFERENCE TO RELATED APPLICATIONS

This application is a U.S. National Phase Patent Application of PCT international Patent Application No, PCT/US2016/018427, filed Feb. 18, 2016, which is related to, and claims the benefit of priority of U.S. Provisional Application No. 62/118,202, entitled PIVOT DEVICE AND METHOD OF GENERATING ASSYMETRIC FRICTION TORQUE, filed on 19 Feb. 2015, the contents of both applications being incorporated herein by reference in their entirety and for all purposes.

FIELD OF THE INVENTION

The present invention relates to the field of pivot devices configured to generate asymmetric friction torque when two parts of an assembly are rotated in opposite directions relative to one another.

BACKGROUND OF THE INVENTION

Pivot devices may include at least two parts that are configured for rotation of one part relative to the other. For example, the pivot device may be in the form of a hinge in which a torque is required to rotate a sleeve and a shaft with respect to one another.

Asymmetric friction torque may be desired in certain applications to maintain the overall assembly comprising the pivot device in a closed position and to resist movement to an open position, for example, but would allow a user to close the assembly from an open position with greater ease. For example, pivot devices may be incorporated in many applications that utilize a clam-shell design, such as a mobile phone or laptop, wherein it is generally desired to provide resistance to opening the lid relative to the base that is greater than the resistance to closing the lid relative to the base, or vice versa. Other examples of applications for such pivot devices may be a drive mechanism or a locking mechanism in which asymmetric friction torque is desired during displacement of various parts of the mechanism between two different positions, such as the movement of a latch or pawl from a locked to an unlocked position.

The configurations needed to generate the asymmetric friction torque for such pivot devices may be complex or require multiple parts. There is therefore a need for improved pivot devices in terms of at least one of cost, manufacturability, the elimination of the need for one or more components or other elements such as lubrication, and performance.

SUMMARY OF THE INVENTION

One aspect of the present invention provides a pivot device having asymmetric friction torque. The pivot device may comprise a shaft extending along a longitudinal axis; a sleeve at least partially surrounding the shaft, the sleeve defining at least one gap extending longitudinally, the sleeve and the shaft being configured for rotation with respect to one another about the longitudinal axis; and a helical compression element surrounding the sleeve and exerting a compressive force onto the sleeve. The pivot device may be further configured, such that a first torque required to rotate the sleeve and the shaft with respect to one another in a first direction differs from a second torque required to rotate the sleeve and the shaft with respect to one another in a second direction opposite to the first direction. In some embodiments, at least one of the shaft or the sleeve is fixed while the other is mounted for rotation with respect to the fixed element. The pivot device may be in the form of a hinge pivotally connecting two components for movement with respect to one another about the longitudinal axis of the shaft, wherein one of the two components includes the sleeve and the other one of the two components includes the shaft.

The gap defined by the sleeve of the pivot may extend in a direction generally along the longitudinal axis from an inner surface to an outer surface of the sleeve. The gap may also be provided in the form of a slot separating arcuate sections of the sleeve. In some embodiments, the slot may have a helical shape that corresponds to a helical direction of the compressive force from the compression element. The compression element may be in the form of a biasing element such as a wrap spring having one or more coils wrapped about the longitudinal axis of the sleeve. The sleeve prevents direct contact between the shaft and the compression element.

Another aspect of the present invention provides a method for providing a pivot having asymmetric friction torque. The method comprises surrounding a shaft with a sleeve defining a gap extending longitudinally, such that the sleeve and the shaft are configured for rotation with respect to one another about a longitudinal axis and surrounding the sleeve with a helical compression element exerting a compressive force onto the sleeve such that a first torque required to rotate the sleeve and the shaft with respect to one another in a first direction differs from a second torque required to rotate the sleeve and the shaft with respect to one another in a second direction opposite to the first direction.

Yet another aspect of the invention provides an assembly having components coupled for pivotal movement with respect to one another. The assembly includes one or more pivot devices.

In another aspect of the invention, the pivot device includes plural sleeves surrounding a shaft, each of the sleeves defining a gap extending longitudinally, and each of the sleeves and the shaft being configured for rotation with respect to one another about the longitudinal axis. A helical compression element surrounds each of the sleeves and exerts a compressive force onto each of the sleeves.

BRIEF DESCRIPTION OF THE DRAWINGS

The above and other aspects and features of the present invention will become more apparent to those of ordinary skill in the art by describing in detail exemplary embodiments thereof with reference to the attached drawings, in which:

FIG. 1 is a schematic view illustrating aspects of the present invention.

FIG. 2a is an exploded view of a first embodiment of a pivot device according to the present invention;

FIG. 2b is a front perspective view of the first embodiment in which the handle has been rotated counter-clockwise from a vertical position;

FIG. 2c is a front perspective view of the first embodiment in which the handle is in the vertical position;

FIG. 2d is a front perspective view of the first embodiment in which the handle has been rotated clockwise from the vertical position;

FIG. 3a is a rear view of the first embodiment illustrated in FIG. 2c;

FIG. 3b is a side view of the first embodiment illustrated in FIG. 2c;

FIG. 3c is a front view of the first embodiment illustrated in FIG. 2c;

FIG. 3d is a top view of the first embodiment illustrated in FIG. 2c;

FIG. 4a is a rear view of the first embodiment illustrated in FIG. 2b;

FIG. 4b is a side view of the first embodiment illustrated in FIG. 2b;

FIG. 4c is a front view of the first embodiment illustrated in FIG. 2b;

FIG. 4d is a top view of the first embodiment illustrated in FIG. 2b;

FIG. 5a is a rear view of the first embodiment illustrated in FIG. 2d;

FIG. 5b is a side view of the first embodiment illustrated in FIG. 2d;

FIG. 5c is a front view of the first embodiment illustrated in FIG. 2d;

FIG. 5d is a top view of the first embodiment illustrated in FIG. 2d;

FIG. 6a is a top view of the first embodiment illustrated in FIG. 2b;

FIG. 6b is a top view of the first embodiment illustrated in FIG. 2c;

FIG. 6c is a top view of the first embodiment illustrated in FIG. 2d;

FIG. 7a is a rear perspective view of a housing for a pivot device according to the first embodiment of the present invention;

FIG. 7b is a side view of the housing of the first embodiment;

FIG. 7c is a rear view of the housing of the first embodiment;

FIG. 7d is a front view of the housing of the first embodiment;

FIG. 7e is a top view of the housing of the first embodiment;

FIG. 7f is a bottom view of the housing of the first embodiment;

FIG. 9a is a front perspective view of the second embodiment in which the handle has been rotated counter-clockwise from a vertical position;

FIG. 9b is a front perspective view of the second embodiment in which the handle is in the vertical position;

FIG. 9c is a front perspective view of the second embodiment in which the handle has been rotated clockwise from the vertical position;

FIG. 10a is a rear view of the second embodiment illustrated in FIG. 9b;

FIG. 10b is a side view of the second embodiment illustrated in FIG. 9b;

FIG. 10c is a front view of the second embodiment illustrated in FIG. 9b;

FIG. 10d is a top view of the second embodiment illustrated in FIG. 9b;

FIG. 11a is a rear view of the second embodiment illustrated in FIG. 9a;

FIG. 11b is a side view of the second embodiment illustrated in FIG. 9a;

FIG. 11c is a front view of the second embodiment illustrated in FIG. 9a;

FIG. 11d is a top view of the second embodiment illustrated in FIG. 9a;

FIG. 12a is a rear view of the second embodiment illustrated in FIG. 9c;

FIG. 12b is a side view of the second embodiment illustrated in FIG. 9c;

FIG. 12c is a front view of the second embodiment illustrated in FIG. 9c;

FIG. 12d is a top view of the second embodiment illustrated in FIG. 9c;

FIG. 13a is a top view of the second embodiment illustrated in FIG. 9a;

FIG. 13b is a top view of the second embodiment illustrated in FIG. 9b;

FIG. 13c is a top view of the second embodiment illustrated in FIG. 9c;

FIG. 14a is a rear perspective view of a housing for a pivot device according to the second embodiment of the present invention;

FIG. 14b is a side view of the housing of the second embodiment;

FIG. 14c is a rear view of the housing of the second embodiment;

FIG. 14d is a front view of the housing of the second embodiment;

FIG. 14e is a top view of the housing of the second embodiment;

FIG. 14f is a bottom view of the housing of the second embodiment;

FIG. 15 is a front perspective view of a torque hinge in an installed condition according to a third embodiment of the present invention;

FIG. 17b is a top view of the partial torque hinge according to the third embodiment illustrated in FIG. 17a;

FIG. 17c is a front view of the partial torque hinge according to the third embodiment illustrated in FIG. 17a;

FIG. 17d is a side view of the partial torque hinge according to the third embodiment illustrated in FIG. 17a;

FIG. 18a is a front perspective view of the torque hinge of FIG. 16 with one hinge leaf removed; and FIG. 18b is a front perspective view of the torque hinge of FIG. 18a with one hinge leaf rotated to a vertical position.

DETAILED DESCRIPTION OF THE INVENTION

Figure 8:
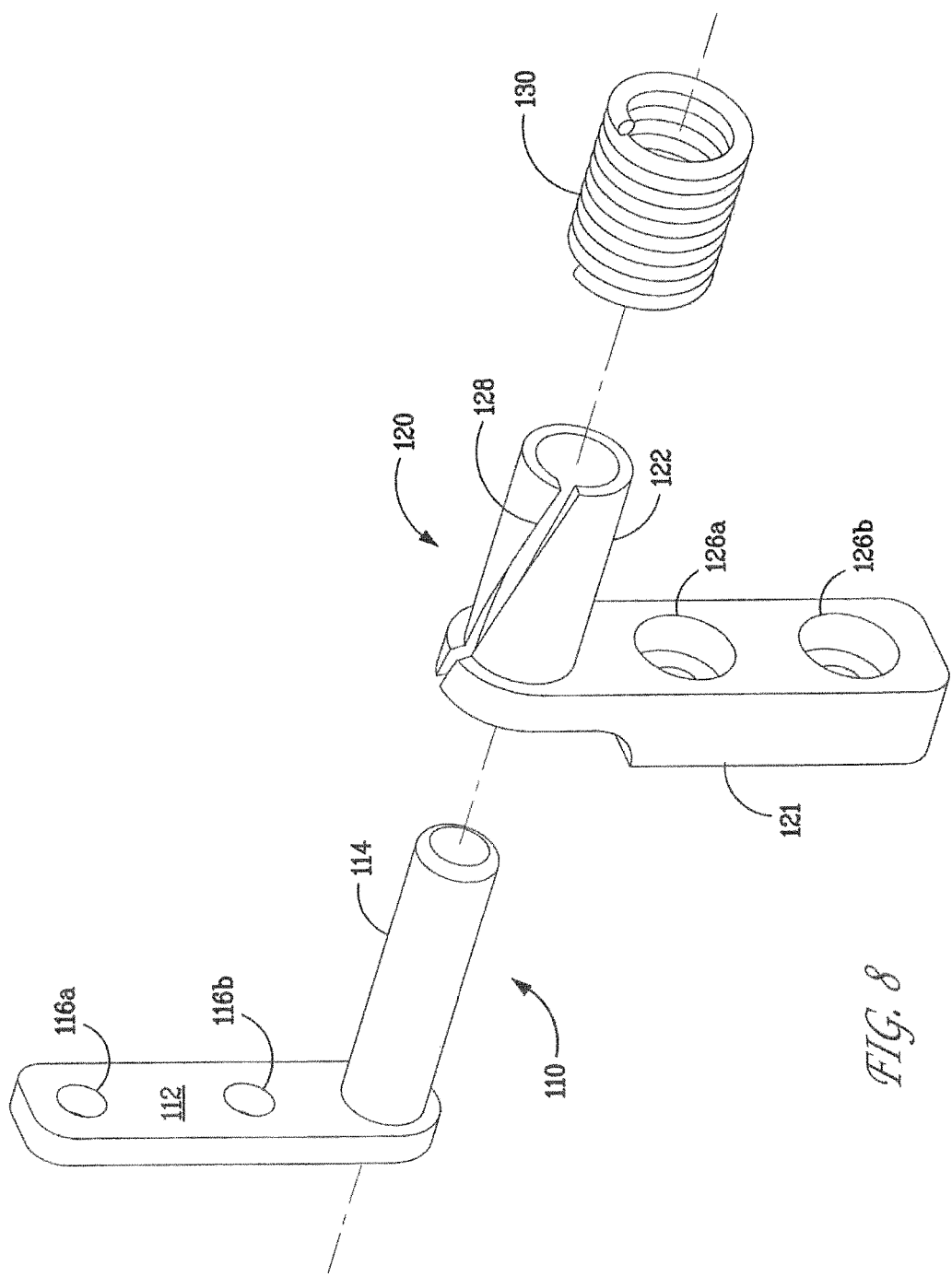
FIG. 8 is an exploded view of a second embodiment of a pivot device according to the present invention.
Figure 16:
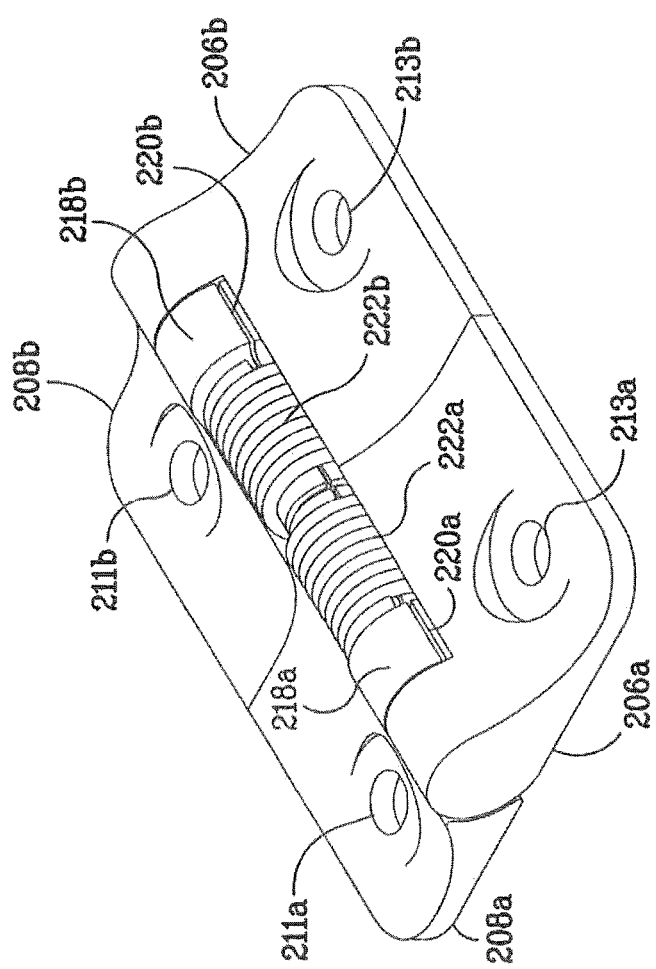
FIG. 16 is a front perspective view of the torque hinge according to the third embodiment in an uninstalled condition.

The invention will now be described by reference to exemplary embodiments and variations of those embodiments. Although the invention is illustrated and described herein with reference to specific embodiments, the invention is not intended to be limited to the details shown and described. Rather, various modifications may be made in the details within the scope and range of equivalents of the claims and without departing from the invention.

Generally, this invention provides a pivot device having asymmetric friction torque. "Asymmetric friction torque" as used herein includes configurations in which the torque required to rotate a first element in one direction is greater than the torque needed to rotate the first element in the opposite direction.

The first element of the pivot device may be, for example, a shaft, while the second element may be a sleeve, for example, wherein the shaft and sleeve coaxially extend along a longitudinal axis with the shaft being inserted through a bore in the sleeve. The sleeve includes a gap that also extends longitudinally along the length of the sleeve. A compression element exerting a compression force, such as a wrap spring, is then applied to the outer surface of the sleeve, such that there is an interference fit between the compression element and the sleeve. More specifically, for example, the compression of the sleeve can be caused by a compression element in the form of a wound helical element having an interference fit over the outer sleeve diameter, such as by expanding a helical wound element over the sleeve. In some embodiments, at least one of the shaft or the sleeve is fixed while the other is mounted for rotation with respect to the fixed element.

Prior pivot devices, such as friction hinges, relied on compression force provided, for example, by a wrap spring applied radially about the circumference of a rotating element, such as a pintle or shaft, to generate torque. Either the wrap spring or the shaft inserted within the spring may be fixed while the other element is rotated. The clutching force of the spring provides frictional forces that resist rotation of the elements relative to one another.

It was generally thought that in order to provide asymmetric torque, the wrap spring should be in direct contact with the circumferential surface of the shaft. Applicants have surprisingly found that such direct contact is not necessary. According to various embodiments of the present invention, a compression element including a helical surface or shape, such as a wrap spring or a jacket having an internal helical thread or surface, does not need to be in direct contact with a sliding surface. Instead, the compression element applies a compression force onto an intermediate element, such as a slotted cylindrical sleeve, located between the compression element and the sliding surface. The compressive force produced by the compression element that is expanded over the cylindrical sleeve has a radial orientation on the circumference of the sleeve surface, and during rotation of a shaft or pintle inside the sleeve, this radial force will create a friction moment. The provision of a slotted sleeve and the helical nature of the compressive element will create a wrap effect in the slotted sleeve in response to the friction moment. This wrap effect results in deformation of the sleeve, the deformation having an axial component, in which a portion of the sleeve is moved axially relative to another portion of the sleeve, and a transverse component, in which a portion of the sleeve is moved relative to another portion of the sleeve in a direction that is transverse to the axis of the sleeve.

In a preferred embodiment, the compression element applies a force in a radial direction with respect to the longitudinal axis of the pintle or shaft. By doing so, it can deform the intermediate element so as to "tighten" the fit of the intermediate element on the pintle or shaft and increase the degree of friction between the intermediate element and the pintle or shaft. When the force of the compression element is provided in a radial direction, it has been discovered that the amount of the deformation of the intermediate element depends on the direction of the rotation of the pintle or shaft with respect to the intermediate element, thus providing asymmetric friction torque.

For example, a cylindrical pintle may be inserted into a corresponding sleeve, such that the pintle and sleeve are mating, and then a wrap spring may be applied to the outer circumferential surface of the sleeve, thereby producing pressure on the sliding surfaces between the sleeve and the pintle. It is not necessary for the compression element to engage any other component of the pivot device other than the intermediate element. Thus, one of the aspects of the present invention is to provide a device of simple construction wherein asymmetric torque may be achieved with three components; namely, a shaft, a slotted intermediate element, and a helical compression element. The compression element maintains its position on the surface of the intermediate element to provide a compressive force that is applied and distributed about the sliding surface of the shaft through the intermediate element during hinge operation.

The intermediate element includes a gap. For example, in a sleeve, the gap may be formed through the wall thickness of the sleeve along the entire axial length of the sleeve. The gap reduces hoop stress in the intermediate element and allows torsional deformation of the intermediate element. The shape of the gap may be straight, i.e. parallel to the longitudinal axis of the intermediate element, or the gap may be helically shaped. The number of turns of the helically shaped gap may be less than 1, e.g. a quarter-turn, or greater than 1. When using a wrap spring as the compression element, the gap is preferably a helically shaped slot and corresponds to the helical direction of the wrap spring. The pitch of the helically shaped slot is also preferably larger than the pitch of the coils of the wrap spring.

The gap or slot provided in the intermediate element is optionally devoid of material or may be completely or partially filled. For example, the material of the intermediate element, or another material, may partially or completely fill or bridge the gap or slot. For example, a thinned web of the material of the intermediate element can extend across the gap or slot. As another example, a different material such as a flexible or deformable material can be applied to partially or completely fill the gap or slot. Also, or alternatively, a separate component such as a web of material or a supplemental sleeve may extend across the gap or slot, such component being interposed between the intermediate element and the shaft or between the intermediate element and the compression element.

Rotation of the circumferential surface relative to the intermediate element, when configured as described above, will produce frictional resistance (i.e. friction torque) proportional to the force produced by the compression element. The force produced by the compression element is dependent on the material of the element, the diameter of the circumferential surface, and the coefficient of friction between the intermediate element and the circumferential surface. Furthermore, depending on the torsional rigidity of the intermediate element and the shape of the gap in the intermediate element, the magnitude and direction of increased friction torque will differ when the circumferential surface rotates in one direction or the opposite direction inside the intermediate element.

The asymmetric frictional torque is the result of the compressive force applied to the outside of the intermediate element while the inner circumference of the intermediate element is in frictional contact with a moving surface and by providing the intermediate element with a gap and a free end. By "free end" it is meant that the intermediate element is configured to extend in one direction from an attachment point, similar to an arm or a cantilevered design.

The asymmetric friction torque will be more pronounced for intermediate elements having lower torsional resistance and less pronounced for intermediate elements made of more rigid material that have higher torsional resistance. Also, an intermediate element having a helically shaped slot matching the helical direction of the compression element will provide a more pronounced asymmetric friction torque than an intermediate element having a straight gap parallel to the longitudinal axis of the intermediate element. For example, an intermediate element in the form of a sleeve may be made of plastic to achieve the highest ratio of resistance in opposite directions or the ratio of resistance may be reduced by using a material for the sleeve with a higher modulus of elasticity, such as a metal.

As explained above, the asymmetric friction torque is a result of the deformation of the slotted intermediate element produced by the helical compression element that compresses the cylindrical surface rotating within the intermediate element. For example when the pivot device comprises a wrap spring, a slotted sleeve, and a pintle, the torque resulting from the frictional resistance is applied on the outer surface of the sleeve, and the inner circumferential surface in frictional contact with a rotating pintle will produce torsional deformation evenly distributed along the full length of the sleeve in the longitudinal direction. If the direction of sleeve deformation and rotational direction of the pintle coincide with the helical direction of the wrap spring, friction forces between the outer circumference of the sleeve and the inner circumference of the wrap spring will wind the wrap spring, thereby increasing the compressive force on the outer circumference of the sleeve and frictional resistance to pintle rotation. Rotation of the pintle in a direction opposite to the helical direction of the wrap spring will cause the torsional deformation of the sleeve in the opposite direction and the wrap spring will unwind, thereby reducing pressure onto the sleeve and less force is required to overcome the frictional torque and rotate the pintle. The torsional deformation is facilitated by providing the sleeve with a free end.

Generally, preferred embodiments of this invention include a helical compression element such as a helically wound spring; an intermediate element such as a sleeve positioned within the compression element; and a shaft such as a pintle positioned within the intermediate element, with the intermediate element being configured to deform, such as by including a slot, so as to provide for asymmetric torque depending on the direction the shaft is rotated relative to the intermediate element.

Referring now to the figures, wherein like numerals refer to like elements throughout the description of the drawings, embodiments of a pivot device according to the present invention are provided.

FIG. 1 provides a schematic view illustrating aspects of the present invention. As illustrated in FIG. 1, a pivot device 1 has asymmetric friction torque. The pivot device 1 may include a rotating surface, such as shaft 2 extending along a longitudinal axis into and out of the plane of FIG. 1. An intermediate element, such as sleeve 3, at least partially surrounds the shaft 2, the sleeve 3 defining a gap, such as gap 5, extending longitudinally. The sleeve 3 and the shaft 2 are configured for rotation with respect to one another about the longitudinal axis.

Although sleeve 3 has a single gap 5, it is optionally provided with more than one such gap. For example, a gap such as gap 5 may extend along the full length of the sleeve 3 and one or more additional gaps or slots may be provided to extend at least partially along the length of the sleeve 3. Such additional gaps can be provided to adjust the degree of deformation of the sleeve as needed.

A compression element such as element 4 at least partially surrounds the sleeve 3 and exerts compressive force onto the sleeve 3. A first torque required to rotate the sleeve 3 and the shaft 2 with respect to one another in a first direction such as direction L differs from a second torque required to rotate the sleeve 3 and the shaft 2 with respect to one another in a second direction, such as direction R, opposite to the first direction L.

As mentioned previously, it was originally believed that direct contact would be necessary between the shaft 2 and the compression element 4 in order to provide asymmetric torque. However, it was surprisingly discovered that such asymmetric torque could be achieved even if the sleeve 3 is interposed between the compression element 4 and the shaft 2 such that there is no direct contact between the compression element 4 and the shaft 2.

A first embodiment of a pivot device according to aspects of this invention, illustrated in FIGS. 2a through 7f, is an assembly that includes an adapter 10, a housing 20, and a wrap spring 30. An exploded view of the assembly is provide in FIG. 2a, wherein the adapter 10 has a handle 11 from which a shaft 14 extends from a lower end portion of a front face 12 of the handle 11. The handle 11 optionally includes one or more fastener holes 16a, 16b, so that the handle 11 may be attached to a first component (not shown), such as a panel or the screen of a laptop computer. The housing 20 includes a bracket 21 and a sleeve 22 at an upper portion of the bracket 21. At least a portion of the sleeve 22 extends from a front face 24 of the bracket 21 and the opposite end of the sleeve 22 is a free end. Similar to the adapter 10, the housing 20 may optionally include one or more fastener holes 26a, 26b, so that the bracket 21 may be secured to a second component (not shown), such as a second panel or the keyboard portion of a laptop computer. The sleeve 22 also includes a gap 28 extending through the thickness of the sleeve 22 and along the entire longitudinal length of the sleeve 22.

Referring to FIGS. 2a to 5d, the first embodiment of a pivot device according to the present invention is provided. The diameter of the shaft 14 should be greater than or equal to the diameter of a bore extending through the longitudinal axis of the sleeve 22, so that there is frictional contact between the outer circumference of the shaft 14 and the inner circumferential surface of the sleeve 22. The wrap spring 30, which is preferably in the form of a coil spring, is applied to the outer circumferential surface of the sleeve 22. The inner diameter of the coils of the wrap spring 30 are preferably equal to or less than the outer diameter of the sleeve 22, so that a compressive force is applied to the outer circumferential surface of the sleeve 22 by the wrap spring 30.

The wrap spring 30 is optionally replaced with any element configured to provide compression and that ideally includes a surface portion extending at an acute angle with respect to the axis of the shaft, such as for example a surface extending helically with respect to the rotational axis of the shaft. Also, such a compression element extends at least partially around the intermediate element but preferably, especially if in the form of a helically extending element, has one or more complete turns around the intermediate element so as to provide improved or substantially constant radial compression.

The same assembly is illustrated in FIGS. 2b, 2c, and 2d, which demonstrates the handle 11 in three different positions. In FIG. 2c, the handle 11 is in a vertical position. The friction torque preventing rotation of the handle 11 in the counter-clockwise direction, i.e. from the vertical position of FIG. 2c to the position illustrated in FIG. 2b, is greater than the friction torque preventing rotation of the handle 11 in the clockwise direction, i.e. from the vertical position to the position illustrated in FIG. 2d.

The cause of the asymmetric friction torque is illustrated in FIGS. 6a, 6b, and 6c. Referring to FIG. 6b, the pivot device is assembled by mounting the wrap spring 30 onto the outer circumferential surface of the sleeve 20 when the handle 11 is in the vertical position. As viewed in FIGS. 6a, 6b, and 6c, rotation of the handle 11 from the position in FIG. 6b to the position in FIG. 6a causes torsional deformation of the sleeve 22. The two arcuate portions of the sleeve 22 on either side of the gap 28 shift in opposite directions as the handle 11 is rotated. The total displacement is labelled as dimension A.

As explained above, the torsional displacement follows the orientation of the coils of the wrap spring 30 causing the wrap spring 30 to wind. The tightening action increases the compressive force applied to the surface of the shaft 14 through the sleeve 22, thereby increasing the friction torque, i.e. resistance to rotation. When the handle 11 is rotated in the opposite direction, as viewed in FIG. 6c, torsional displacement of the sleeve causes the two opposing arcuate sections of the sleeve 22 on either side of the gap 28 to longitudinally shift, as represented by dimension A', in the opposite direction to the displacement observed in FIG. 6a. The torsional displacement again follows the orientation of the coils of the wrap spring 30, but this time causing the spring 30 to unwind, thereby reducing the compressive force on the exterior surface of the sleeve 22 and shaft 14.

As would be understood by those of skill in the art, the amount of torsional displacement of the sleeve 22 in either direction when the handle 11 is rotated may be controlled by one or more factors. Varying the coefficient of friction between the outer circumferential surface of the shaft 14 and the inner circumferential surface of the sleeve 22 and/or the outer circumferential surface of the sleeve 22 and the inner circumferential surface of the wrap spring 30 by, for example, roughening the contact surfaces, changing the relative diameters of the mating components, varying the width of the gap 28, or varying the longitudinal length of the contact surfaces would also enable modification of the frictional torque.

The contact surface between the wrap spring 30 and sleeve 22 may also be modified to produce more constant torsional displacement. The wrap spring 30 of the first embodiment is illustrated as being made from a coiled wire having a circular cross-section. The compression force on the surface of the sleeve would therefore be focused or concentrated on a line comprising the single points on the circumference of the cross-section having a length equal to the length of the uncoiled wire. Over time, this focused compressive force will result in deformation of the outer surface of the sleeve, especially if the sleeve is made from a relatively softer material, such as a plastic or polymeric material. Thus, as the wrap spring is wound and unwound, each coil may tend to embed itself deeper and deeper into the surface of the sleeve.

If, instead, the wrap spring was made from a wire having a square or rectangular cross-sectional shape (for example, helical wound spring can be made of square section wire), it will improve on the deformation the spring will produce on the outer surface of the sleeve. Round wire spring has very small contact area with the sleeve, thus creating a very high local pressure. A square wire, for example, will have much larger area of contact and much less surface pressure, therefore much less local deformation. As a result, it will lead to more consistent friction torque, and the points of contact would be spread out over the width of the cross-section of the wire, instead of a single point, resulting in less deformation on the surface of the sleeve and producing a more constant friction torque during the life of the pivot device.

Finally, as mentioned above, the materials used to fabricate the sleeve 22 and the wrap spring 30 may be modified, such that modulus of elasticity of the material may be used to control the resulting torsional displacement of the sleeve 22 and/or wrap spring 30. Using a material having a lower modulus of elasticity, such as plastic, to fabricate the sleeve also provides the advantage that inexpensive materials may be used to manufacture the sleeve, as opposed to metal. The elimination of metal-on-metal contact surfaces also obviates the need for grease or oils for lubrication, so that such lubrication is optionally eliminated. Torsional deformation may also be affected by modifying the radial thickness of the sleeve 22 and the wrap spring 30 wherein a thinner radial thickness may facilitate greater torsional displacement, while a greater thickness may result in a more rigid sleeve 22 or wrap spring 30 and less torsional displacement. The rigidity of the sleeve 22 may also be reduced by providing the sleeve 22 with one or more slits that partially extend from an end of the sleeve along its longitudinal length.

Another factor that may affect the torsional displacement of the sleeve is the orientation and shape of the gap. Referring to FIGS. 7a to 7f, the housing 20 for the pivot device made according to the first embodiment of the present invention may include a straight gap 28 that is parallel to the longitudinal axis of the sleeve 22. In a second embodiment of the present invention illustrated in FIGS. 8 to 14f, the gap 128 is now helically shaped about one quarter turn around the outer circumferential surface of the sleeve 122. All of the other features of the second embodiment are the same as the features of the first embodiment. An adapter 110 comprising a handle 111 and a shaft 114 extending from a front face 112 of the handle 111 is matingly coupled to the inner bore of a sleeve 122 of a housing 120. The housing 120 includes a bracket 121 having a front face 124 from which the sleeve 122 extends. Again, the handle 111 and bracket 121 may optionally include one or more fastener holes 116a/b, 126a/b. Finally a wrap spring 130 is applied to the outer circumferential surface of the sleeve 122. The only difference between the first embodiment and the second embodiment of the pivot device is the shape/orientation of the gap 128 in the sleeve 122, as best viewed in FIGS. 14a to 14f.

Referring to FIGS. 13a, 13b, and 13c, rotation of the handle 111 from the position in FIG. 13b to the position in FIG. 13a causes torsional displacement of the sleeve 122 and a winding of the wrap spring 130, increasing the friction torque during rotation of the handle 111. Again, the two arcuate portions of the sleeve 122 on either side of the gap 128 shift in opposite directions as the handle 111 is rotated. The total displacement is labelled as dimension B. Rotation of the handle 111 in the opposite direction, i.e. from the position in FIG. 13b to the position in FIG. 13c, will cause torsional displacement in the opposite direction and unwind the wrap spring 130, reducing the friction torque as the handle 111 is rotated. The longitudinal displacement of the two arcuate portions of the sleeve 122 in the opposite direction is labelled as B'. Using a radially extending axis that is perpendicular to the longitudinal axis of the wrap spring 130 as a reference, the pitch of the gap 128 is greater than the pitch of the coils of the wrap spring 130.

Orienting the gap 128 in this manner amplifies the asymmetry of the torque by reducing the torsional resistance of the sleeve 122 in the helical direction of the wrap spring 130. More deformation of the sleeve 122 may be achieved under the same stress as compared to a sleeve having a straight slot, such sleeve 22 of the first embodiment. Increasing the number of turns of the helically shaped gap 128 will proportionally increase the potential torsional deformation and further increase the ratio of friction torque between the one rotational direction to the other. A person of ordinary skill in the art will recognize that a sleeve molded from plastic, for example, may be molded with a helically shaped gap having more than the quarter turn illustrated in the second embodiment of the invention by using specially designed tooling and/or molding processes.

Referring now to FIGS. 15 to 18b, a torque hinge employing a third embodiment of the present invention is provided. As illustrated in FIG. 15, the torque hinge 200 may be used to connect two panels 202, 204, such that the two panels 202, 204 are rotatable relative to one another. The torque hinge according to the present invention may be comprised of at least two leaves. However, the torque hinge 200 according to the third embodiment preferably has four leaves, 206a/206b and 208a/208b.

The pintle retaining leaves 206a, 206b are fastened to the first panel 202 using threaded bolts 210a, 210b, while the wrap spring retaining leaves 208a, 208b are fastened to the second panel 204 using similar threaded bolts 212a, 212b. Any number of fastening means known to those of skill in the art may be employed to attach the leaves of the torque hinge to a respective panel.

As would be recognized by those of skill in the art, the torque hinge 200 may be rotated 180°, such that the pintle retaining leaves 206a, 206b is fastened to the second panel 204, while the wrap spring retaining leaves 208a, 208b are fastened to the first panel 202. Depending on the application, there may be circumstances in which either the first panel 202 or the second panel 204 may be fixed while the other panel is rotated.

Referring to FIGS. 16 and 17a-17d, the torque hinge 200 is preferably comprised of four leaves. If a bolt or similar fastener is used to attach the leaves to a panel, the panels may include a through-hole 211a, 211b, 213a, 213b to receive the fastener. Each wrap spring retaining leaf 208a, 208b is provided with a sleeve 218a, 218b having a longitudinal gap 220a, 220b. One end of each sleeve 218a, 218b is attached to a retaining leaf while the opposite end is an unattached free end. Prior to inserting a pintle 214 through the inner bore of the two sleeves 218a, 218b, a wrap spring 222a, 222b is applied to one sleeve, 218a, 218b.

The two wrap springs 222a, 222b have coils that are wound in opposite directions. Thus, the left and right wrap spring retaining leaves 208a, 208b are identical except that they are mirror images of one another. After the pintle 214 is inserted through the bore of both sleeves 218a, 218b, the pintle retaining leaves 206a, 206b are applied. It is preferred that the pintle retaining leaves 206a, 206b are provided as two opposing halves that are mirror images, similar to the wrap spring retaining leaves 208a, 208b, and that the opposite end portions of the pintle are provided with knurled sections 216a, 216b, so that the each pintle retaining leaf 206a, 206b may be press-fit onto one knurled section 216a, 216b. The knurled sections 216a, 216b enable the pintle 214 to be rotated with the pintle retaining leaves 206a, 206b. Alternatively, it may be possible to provide a single pintle retaining leaf that is overmolded over the ends of the pintle; however, press-fitting is preferred.

Figure 17A:
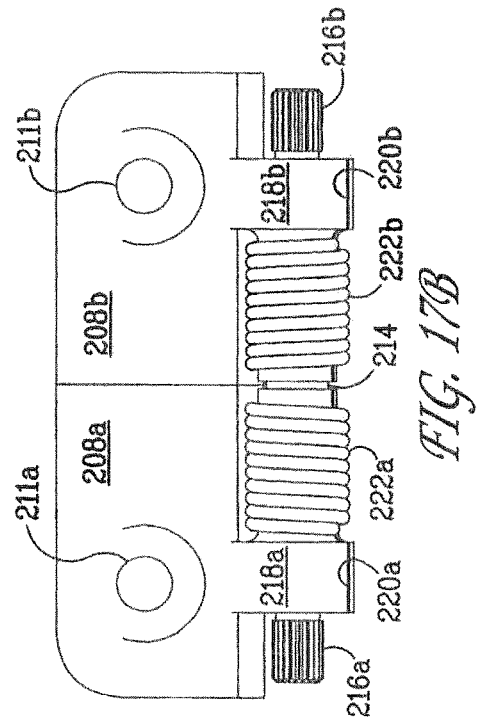
FIG. 17a is a front perspective view of the torque hinge of FIG. 16 with two hinge leaves removed.
Figure 17B:
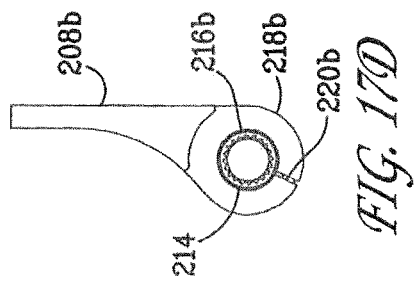
Figure 17C:
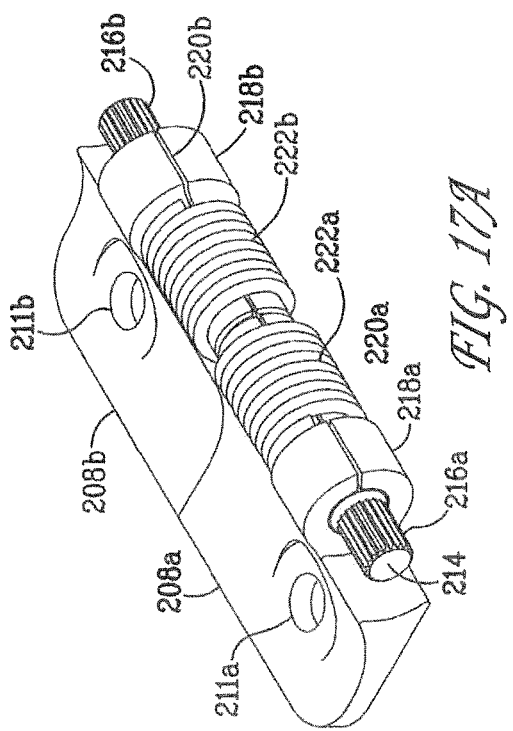
Figure 17D:
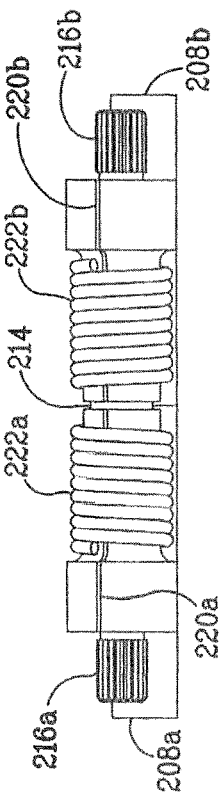

As illustrated in FIGS. 17b and 17c, the coils of the left wrap spring 222a are wound in the opposite direction as the coils of the right wrap spring 222b. This is because the left and right sleeves 218a and 218b are extending towards each other in an opposing relationship. When viewing the torque hinge from the side along the longitudinal axis from the right knurled section 216b, the pintle 214 will rotate clockwise relative to the right sleeve 218b. However, when viewing the torque hinge from the left side along the same longitudinal axis from the left knurled section 216a, the same pintle 214 will rotate counter-clockwise relative to the left sleeve 218a.

The wrap springs 222a, 222b are therefore preferably wound in opposite directions, so that the torsional deformation causing the wrap springs to wind and increase the resulting torque friction during rotation of the pintle 214 will be the same on both sides of the torque hinge. If the wrap springs 222a, 222b had coils wound in the same direction, an increase in torque friction would occur on one sleeve and a decrease in the torque friction would occur on the opposing sleeve when the pintle retaining leaves 206a, 206b are rotated together in either direction, thus resulting in symmetric torque friction.

As previously explained, the magnitude and ratio of the torque friction generated when rotating the torque hinge in opposite directions may be modified in a variety of ways. For example, the range of rotation of the leaves of the hinge relative to one another, the location, orientation, and dimensions of the gap in the sleeve, and the coefficient of friction between and area of the contact surfaces (i.e. the contact surfaces between the pintle, sleeve, and wrap spring), and the modulus of elasticity and thickness of the sleeve/wrap spring material.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A pivot device having asymmetric friction torque, the pivot device comprising:
    a shaft extending along a longitudinal axis;
    a sleeve at least partially surrounding the shaft, the sleeve defining a gap extending longitudinally, the sleeve and the shaft being configured for rotation with respect to one another about the longitudinal axis; and
    a compression element at least partially surrounding the sleeve and exerting a compressive force onto the sleeve;
    wherein a first torque required to torsionally displace the sleeve and rotate the shaft with respect to one another in a first direction differs from a second torque required to torsionally displace the sleeve and rotate the shaft with respect to one another in a second direction opposite to the first direction.

2. The pivot device of claim 1, wherein the gap defined by the sleeve extends in a direction generally parallel to the longitudinal axis.

3. The pivot device of claim 1, wherein the gap defined by the sleeve is provided by a recess formed in at least one of an inner surface and an outer surface of the sleeve.

4. The pivot device of claim 1, wherein the gap defined by the sleeve extends from an inner surface to an outer surface of the sleeve.

5. The pivot device of claim 4, wherein the gap defined by the sleeve provides a slot separating opposing arcuate sections of the sleeve.

6. The pivot device of claim 5, wherein the slot separating opposing arcuate sections of the sleeve has a helical shape relative to the longitudinal axis of the sleeve.

7. The pivot device of claim 6, wherein the compression element is a wrap spring comprising a plurality of coils and the helical shape of the slot defined in the sleeve corresponds generally to a helical direction of the coils of the wrap spring.

8. The pivot device of claim 5, wherein the sleeve is configured to have an unattached free end.

9. The pivot device of claim 1, wherein the sleeve prevents contact between the shaft and the compression element.

10. The pivot device of claim 1, wherein the compression element is a coil wrapped about the longitudinal axis of the sleeve.

11. The pivot device of claim 1, wherein the sleeve is fixed against rotation and the shaft is mounted for rotation with respect to the sleeve.

12. The pivot device of claim 1, wherein the shaft is fixed against rotation and the sleeve is mounted for rotation with respect to the shaft.

13. The pivot device of claim 1, wherein the pivot device forms a hinge pivotally connecting two components for movement with respect to one another about the longitudinal axis of the shaft.

14. The pivot device of claim 13, wherein one of the two components include the sleeve and the other one of the two components includes the shaft.

15. A method for providing asymmetric friction torque to a pivot device, the method comprising:
surrounding a shaft with a sleeve defining a gap extending longitudinally such that the sleeve and the shaft are configured for rotation with respect to one another about a longitudinal axis; and
surrounding the sleeve with a compression element exerting a compressive force onto the sleeve such that a helical force component is applied to the sleeve upon rotation of the shaft and a first torque required to torsionally displace the sleeve and rotate the shaft with respect to one another in a first direction differs from a second torque required to torsionally displace the sleeve and rotate the shaft with respect to one another in a second direction opposite to the first direction.

16. The method of claim 15, wherein the step of surrounding the shaft includes orienting the gap defined by the sleeve to extend in a direction generally parallel to the longitudinal axis.

17. The method of claim 15, wherein the step of surrounding the shaft includes orienting the gap such that a helical shape of the gap is positioned relative to the longitudinal axis of the sleeve.

18. The method of claim 17, wherein the step of surrounding the sleeve with a compression element comprises surrounding the sleeve with a wrap spring comprising a plurality of coils such that the helical shape of the gap defined by the sleeve generally corresponds to a helical direction of the coils of the wrap spring.

19. An assembly having components coupled for pivotal movement with respect to one another, the assembly comprising one or more pivot devices according to claim 1.

20. The assembly of claim 19 comprising plural pivot devices, wherein the longitudinal axis of the shaft of one of the pivot devices is the same as the longitudinal axis of the shaft of another one of the pivot devices.

21. The pivot device of claim 1, the pivot device comprising:
plural sleeves surrounding the shaft, each of the sleeves defining a gap extending longitudinally, and each of the sleeves and the shaft being configured for rotation with respect to one another about the longitudinal axis; and
a compression element surrounding each of the sleeves and exerting a compressive force onto each of the sleeves.

22. The pivot device of claim 21, each of the sleeves having a free end.

23. The pivot device of claim 22, wherein the free end of a first one of the sleeves faces in a direction along the longitudinal axis of the shaft and the free end of a second one of the sleeves faces in an opposite direction along the longitudinal axis of the shaft.

24. The pivot device of claim 23, wherein the compression element surrounding the first one of the sleeves is oriented in a direction opposite the compression element surrounding the second one of the sleeves.

25. A pivot device having asymmetric friction torque, the pivot device comprising:
a shaft extending along a longitudinal axis;
a compression element at least partially surrounding the shaft and exerting a compressive force toward the shaft;
a sleeve at least partially surrounding the shaft and interposed between the shaft and the compression element, the sleeve and the shaft being configured for rotation with respect to one another about the longitudinal axis;
wherein a first torque required to torsionally displace the sleeve and rotate the shaft with respect to one another in a first direction differs from a second torque required to torsionally displace the sleeve and rotate the shaft with respect to one another in a second direction opposite to the first direction.

26. The pivot device of claim 25, wherein the sleeve defines a gap extending longitudinally, thereby permitting deformation of the sleeve upon rotation of the sleeve and the shaft with respect to one another.

27. The pivot device of claim 26, wherein an amount of the deformation of the sleeve upon rotation of the sleeve and the shaft with respect to one another in the first direction differs from an amount of the deformation of the sleeve upon rotation of the sleeve and the shaft with respect to one another in the second direction.

28. The pivot device of claim 25, wherein the compression element is configured such that a helical force component is applied to the sleeve upon rotation of the shaft, thereby causing axial deformation of at least a portion of the sleeve upon rotation of the sleeve and the shaft with respect to one another.

29. The pivot device of claim 28, wherein an amount of the axial deformation of the portion of the sleeve upon rotation of the sleeve and the shaft with respect to one another in the first direction differs from an amount of the deformation of the portion of the sleeve upon rotation of the sleeve and the shaft with respect to one another in the second direction.

30. The pivot device of claim 1, wherein the first torque and the second torque each rotate the sleeve.

31. The method of claim 15, wherein the first torque and the second torque each cause rotation of the sleeve.

32. The pivot device of claim 25, wherein the first torque and the second torque each rotate the sleeve.

* * * * *